United States Patent [19]

Petrov et al.

[11] Patent Number: 4,829,503
[45] Date of Patent: May 9, 1989

[54] OPTICAL MEMORY

[75] Inventors: Vyacheslav V. Petrov; Alexandr A. Antonov; Alexandr P. Tokar; Andrei A. Krjuchin; Semen M. Shanoilo; Vladimir P. Skuridin; Leonid M. Gapchenko; Valery D. Kovtun; Marat L. Demyanov; Alexandr A. Zelinsky; Dmitry A. Grinko; Tatyana P. Ananchenko; Georgy N. Kostsevich, all of Kiev, U.S.S.R.

[73] Assignee: Institut Problem modelirovaniya v energetiki AN Ukr. SSR, Kiev, U.S.S.R.

[21] Appl. No.: 134,785

[22] Filed: Oct. 6, 1987

[30] Foreign Application Priority Data

Feb. 7, 1986 [SU] U.S.S.R. .............................. 3134541
Feb. 5, 1987 [SU] U.S.S.R. .............................. 3134137

[51] Int. Cl.$^4$ ........................ G11B 7/00; G01D 15/10; H04N 1/21
[52] U.S. Cl. .................................... 369/111; 369/100; 369/113; 369/114; 369/115; 369/121; 346/76 L; 346/125; 346/138; 358/296; 358/300
[58] Field of Search ............... 369/110, 111, 112, 113, 369/114, 115, 120, 121, 146, 179, 151, 100; 355/3 DD, 3 DR; 346/5, 6, 76 L, 138, 103, 125, 126, 127, 132, 138, 160; 358/296, 300, 301

[56] References Cited

U.S. PATENT DOCUMENTS

| | | | |
|---|---|---|---|
| 3,373,414 | 3/1968 | Carter | 346/138 X |
| 3,925,607 | 12/1975 | Hauber | 346/138 X |
| 4,074,282 | 2/1978 | Balas, Jr. et al. | 346/76 L X |
| 4,233,612 | 11/1980 | Hirayama et al. | 346/160 |
| 4,297,713 | 10/1981 | Ichikawa et al. | 346/160 X |
| 4,351,005 | 9/1982 | Imai et al. | 358/300 X |
| 4,528,580 | 7/1985 | Inoue et al. | 346/160 |
| 4,564,850 | 1/1986 | Kazuharu | 346/76 L X |
| 4,693,548 | 9/1987 | Tsunoi | 346/160 X |
| 4,717,925 | 1/1988 | Shibata et al. | 346/160 X |

FOREIGN PATENT DOCUMENTS

| | | | |
|---|---|---|---|
| 0051339 | 5/1982 | European Pat. Off. | 369/111 X |
| 3203599 | 8/1982 | Fed. Rep. of Germany | 369/111 X |
| 2479525 | 10/1981 | France | 369/111 X |
| 1580398 | 12/1980 | United Kingdom | 369/100 X |

OTHER PUBLICATIONS

IEEE Spectrum, 1979, II, No. 2, pp. 33–38.

Primary Examiner—William L. Sikes
Assistant Examiner—Brian M. Healy
Attorney, Agent, or Firm—Lilling & Greenspan

[57] ABSTRACT

Disclosure is made of an optical memory wherein a cylindrical information carrier (2) is disposed in a stationary cylindrical container (14) filled with a liquid or gaseous medium transparent for the radiation flux emitted by a source (1) of modulated coherent radiation. The cylindrical information carrier (2) is equipped with a rotational drive. A recording coating (12) is applied on a tubular base (11) of the cylindrical information carrier (2). The cylindrical information carrier (2) is optically connected with the source (1) of modulated coherent radiation and with an addressing unit (3) arranged so that its optical elements can move axially with respect to the cylindrical information carrier (2).

8 Claims, 3 Drawing Sheets

OPTICAL MEMORY

FIELD OF THE INVENTION

This invention relates to information storage devices and, particularly, to otpical memories.

PRIOR ART

Intelligence of computers largely depends on the sophistication of their external memory. At present, inadequate external storage devices make computers two or three orders of magnitude slower than their computing component units. Vital technical characteristics of external memories include such parameters as information capacity, recording density, access time, information exchange time, and storage reliability. Optical external memory possesses certain advantages as compared to magnetic external storage devices, such as larger capacity, greater record-ing density and reliability. In this connection, optical memory are looked upon as more promising storage devices by comparison with magnetic storage devices.

Theres is known an optical memory (IEEE Spectrum, 1979, II, No. 2, pp. 33-38) which comprises a source of modulated electromagnetic radiation including a laser and a light modulator and a movable information carrier optically connected with the radiation source and made as a sealed optical disk, a recording coating being applied on the internal surfaces of the transparent disk walls, and an addressing unit.

However, this optical memory has several disadvantages, such as low reliability and low recording density. The memory is not reliable because the sealed optical disk is fragile and, inaddition, its working surfaces can be deformed by changes in the atmospheric pressure. The recording density is not high because the recording is not uniformly dense and varies for tracks having different radii. Moreover, the resolution of the "dry" objective lens provided in the movable optical head is rather low, its numerical aperture cannot be more than one.

The closest prior art, both by the result achieved and in technical essense, is an optical memory (GB, A, No. 1 580 398) comprising a source of modulated coherent radiation, which is optically connected with a cylindrical information carrier equipped with a rotational drive, and an addressing unit.

The cylindrical information carrier is actually a rigid non-transparent cylinder. A recording coating is applied on the external surface of this cylinder. A relatively thin protective cylinder is secured, by means of separation rings, on the cylindrical information carrier. The external protective transparent cylinder rotates with the rigid non-transparent cylinder when the memory is operated.

In order to protect the external protective cylinder from being deformed by changes in the atmospheric pressure, the inner space of the cylindrical optical carrier is communicated with the atmosphere.

But the recording density and reliability of this optical memory are also insufficiently high. The low recording density is due to the fact that the recording coating used for recording information can only be applied on the external surface of a rigid non-transparent cylinder or drum and due to the use of a "dry" objective lens. The device is not sufficiently reliable because its inner space is not sealed off. When the operational temperature of the carrier changes in relation to the environment temperature, this carrier "breathes". Dust, moisture, and dirt penetrate into its inner space and are deposited directly on the surface of the recording coating, thus seriously affecting the reliability of recording and readout processes.

This optical memory is not very reliable also because the protective transparent cylinder surface is easily damaged since it rotates with the cylindrical carrier at a very high speed. The design of the information carrier is not strong either.

DISCLOSURE OF THE INVENTION

This invention is to provide an optical memory which is more reliable and has a higher recording density.

The invention consists in that in an optical memory comprising a source of modulated coherent radiation, which is optically connected with a cylindrical information carrier equipped with a rotational drive, a recording coating being applied on a tubular base of said cylindrical information carrier, and an addressing unit disposed so that optical elements can move axially with respect to the cylindrical information carrier, according to the invention, the cylindrical information carrier is placed in a stationary cylindrical container filled with a liquid or gaseous medium transparent for the radiation flux from the source of modulated coherent radiation.

It is advisable that, in an optical memory, the drive for rotation of the cylindrical information carrier should be an electric motor having its rotor disposed on at least one of the butt ends of the cylindrical information carrier an its stator disposed on the external surface of the stationary cylindrical container.

It is also advisable that, in an optical memory, the drive for rotation of the cylindrical information carrier should be an electric motor having its rotor installed on the lateral surface of the cylindrical information carrier and its stator on the external surface of the stationary cylindrical container.

The optical memory made according to the invention makes recording and readout of information more reliable by effective protection of the cylindrical information carrier from dirt and damage. When the carrier in the optical memory has to be replaced, the cylindrical container with the cylindrical information carrier inside is replaced as a unit. The cylindrical information carrier is never taken from the container for whatever reason and cannot, therefore, be damaged or soiled.

It is desirable that sealing bushings should be installed on the butt ends of the tubular base of the cylindrical information carrier.

Since the internal space of the cylindrical information carrier is sealed off, highly effective recording coatings can be used even when they are made of unstable materials, such as easily oxidizable by air or poisonous substances. It also becomes possible to employ highly effective methods to regenerate the recording coatings, e.g. by a high-frequency discharge in the inner space of the cylindrical carrier, which may be filled with a gas inert in relation to such materials.

It is also advisable that the stationary cylindrical container should be made of a material non-transparent for the radiation flux and that at least one slot should be provided in the cylindrical surface thereof so that an element transparent for the radiation flux from the source of modulated coherent radiation could be arranged therein.

It is desirable that the transparent element disposed in the slot should be made as a cylindrical lens.

The use, in the optical memory, of a non-transparent cylindrical container is an adequate protection for the cylindrical information carrier from the destructive effects of light, e.g. sunrays. It is for this reason that at least one slot is provided in the wall of the cylindrical container in order to let the flux from the laser to the cylindrical carrier. A transparent element is disposed in this slot and made as a cylindrical lens. This makes it possible, for example, to introduce corrections in the optical system for the curvilinear surface of the cylindrical information carrier.

It is possible that in the cylindrical information carrier the recording coating should be applied on the external and internal surfaces of the tubular base.

This permits to double the volumetric recording density of the optical memory.

It is desirable that a conducting coating should be applied on the external surface of the cylindrical information carrier, which should be transparent for the radiation flux emitted by the source of modulated coherent radiation. This conducting coating should be in contact with the conducting cylindrical container.

This conducting coating ensures that the static electricity charge runs off the external surface of the cylindrical information carrier to the conducting cylindrical container. The static charge may appear because of the friction between the rotating cylinder and the liquid or gaseous medium. In this manner the surface of the cylindrical information carrier collects less dirt and the reliability of recording in substantially improved.

BRIEF DESCRIPTION OF THE ACCOMPANYING DRAWINGS

The invention will now be described in greater detail with reference to specific embodiments thereof and accompanying drawings wherein.

BEST MODE FOR CARRYING OUT THE INVENTION

Figure 1:
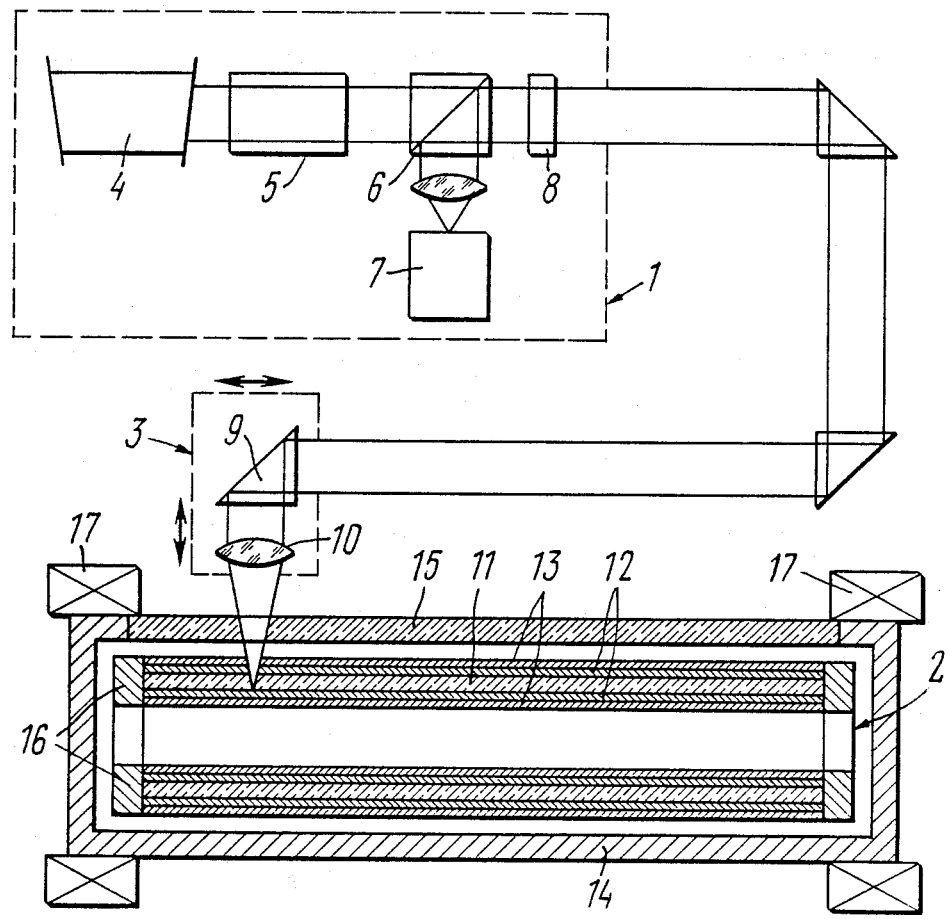
FIG. 1 shows a general view of an optical memory according to the invention.

An optical memory, according to the invention, comprises optically connected units: a source 1 of modulated coherent radiation, a cylindrical information carrier 2 equipped with a drive for rotation, and an addressing unit adapted for axial motion of its optical elements with respect to the cylindrical carrier 2.

The source 1 of modulated coherent radiation 1 comprises the following optically connected units: a laser 4, an optical modulator 5, and a polarization beam splitter 6. One output of the polarization beam splitter 6 is optically connected with a photodetector 7, while the other output thereof is optically connected, via a quarter wave plate 8, to the addressing unit 3 and to the cylindrical information carrier 2.

The addressing unit 3 comprises two optically connected elements; a prism 9 receiving the radiation flux emitted by the source 1 of modulated coherent radiation and a lens 10 supplying the radiation flux to the cylindrical information carrier 2.

The cylindrical information carrier 2 is made as a tubular base 11 transparent for the radiation flux emitted by the source 1 of modulated coherent radiation. It can be made, for example, of quartz glass. A recording coating 12 and a protective coating 13 are applied on the external and internal surfaces of the carrier 2.

The cylindrical information carrier 2 is coaxially arranged within a stationary cylindrical container 14 whose lateral surface is provided with a slot 15 wherein is installed an element optically transparent for the radiation flux. The cylindrical container 14 is filled with a gaseous medium, e.g air, and is made from a non-transparent material.

The gaseous medium inside the cylindrical container 14 is supplied from the outside by an excess pressure through calibrated nozzles (not shown in the drawings for simplicity) and leaves the cylindrical container 14 through axial ducts (not shown either) and functions as a gaseous lubricant. This ensures free rotation of the cylindical information carrier 2 relative to the container 14.

Rotors 16 of the motor are installed on the butt faces of the tubular base 11 in order to rotate the cylindrical information carrier 2. Stators 17 of this motor are installed on the lateral surface of the cylindrical container 14.

The cylindrical information carrier 2 is provided, prior to being placed into the cylindrical container 14, with reference tracks and service information recorded on information carrying tracks. During operation, the cylindrical information carrier 2 is rotated by the motor and unmodulated radiation flux of the laser 4 is transmitted through the slot 15 where a transparent optical element is located. The intensity of the radiation flux corresponds to the readout function. The reflected radiation flux which has been modulated by information recorded on the cylindrical carrier 2 is supplied to the photodetector 7 and is converted therein into an electrical signal. A control unit (not shown) extracts, from this electric signal, information on the number of information track hit by the radiation flux, and this number is compared with the number of the track corresponding to the desired address. In case they do not coincide, the control unit produces an instruction to the addressing unit 3, and movable optical elements shift the radiation flux to the desired address. In addition, the control unit can issue a command to re-focus to another recording coating, which is fed to the movable lens 10. After that, the control unit processes the electrical signal fed from the output of the photodetector 7 to obtain information on the number of sector hit by the radiation flux. In case both the readout and desired addresses coincide, information on the cylindrical carrier 2 is read out or new information is recorded to be stored. The signal to be recorded is first supplied to the optical modulator 5.

This design of the optical memory according to the invention makes recording and storage of information more reliable, because the cylindrical container 14 effectively protects the cylindrical information carrier 2 from dirt and damage.

In another embodiment of the optical memory according to the invention the tubular base 11 (FIG. 2) is made from a material transparent for the radiation flux. A recording coating 12 is applied onto the internal surface of the tubular base 11 and sealing bushings 18 are provided in the butt ends thereof. The sealing bushings 18 may have any shape but the material they are made of should have the same thermal coefficient of expansion as that of the transparent tubular base 11. A rotor 19 of the motor is installed on the inside surface of the tubular base 11 in one of the butt ends thereof, while a stator 20 of this motor is installed on the external lateral surface of the cylindrical container 14 and envelops the rotor 19. In all other respects the design of the optical memory of FIG. 2 and its operation are similar to those of FIG. 1.

Since the cylindrical information carrier is sealed, this optical memory has an even higher degree of protection of the recording layer 12 from damage and penetration of dirt is completely excluded.

Figure 2:
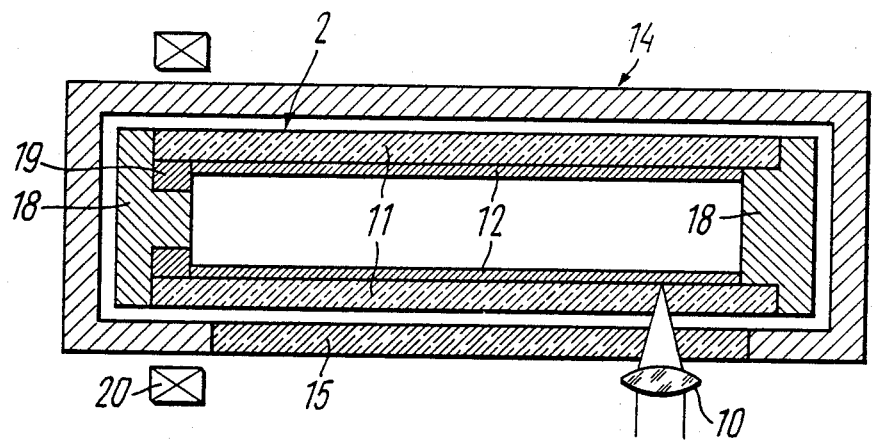
FIG. 2 shows an embodiment of a cylindrical information carrier disposed in a stationary cylindrical container and equipped with a motor as a rotational drive, according to the invention.
Figure 3:
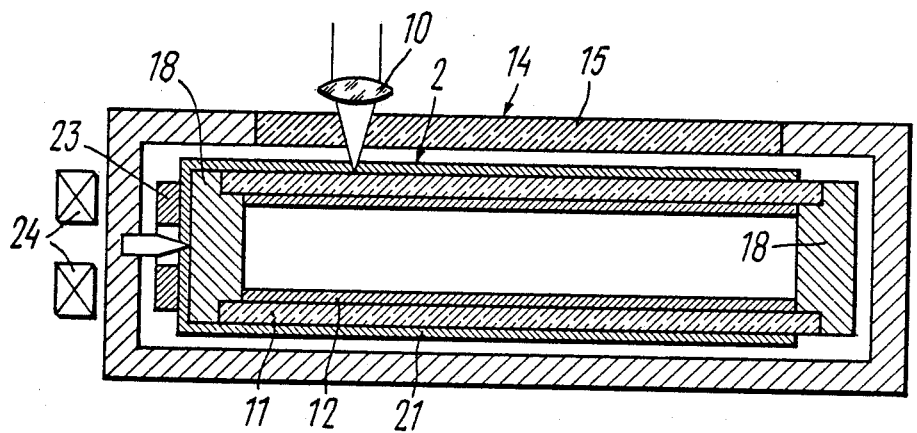
FIG. 3 shows the embodiment of FIG. 2 but with a different arrangement of the rotor and stator of the drive motor, according to the invention.

In still another embodiment of the invention, the optical memory shown in FIG. 2 has electrically conducting coating 21 applied on the external surface of the tubular base 11 (FIG. 3) and the sealing bushings 18. This conducting coating 21 is connected by a pin 22 with the cylindrical container 14. The rotor 23 of the motor rotating the cylindrical information carrier 2 is installed in the buff end of one of the sealing bushings 18, while a stator 24 is installed in the butt end of the cylindrical container 14 on the same side with the rotor 23.

In all other respects the design of the optical memory and its operation are analogus to that of the embodiments shown in FIGS. 1 and 2.

The electrically conducting coating provided in this embodiment provides a way for the static electricity charge produced by friction of the external surface of the cylindrical information carrier 2 against the gaseous medium in the cylindrical container 14 to run off its external surface to the cylindrical container 14. Elimination of the static charge results in less dirt sticking to the cylindrical information carrier 2 and, consequently, in improvement in information recording and storage.

There is one more embodiment of an optical memory according to the invention, wherein the space of the cylindrical container 14 (FIG. 4) is filled with a liquid medium 25, e.g. distilled water, and a recording coating 12 is applied on the internal surface of the tubular base 11, sealing bushings 18 being installed in the butt ends thereof. A rotor 26 of the electric motor rotating the cylindrical information carrier 2 is installed on one of the sealing bushings 18, while a stator 27 is installed on the lateral wall of the cylindrical container 14 and envelops the rotor 26.

Figure 4:
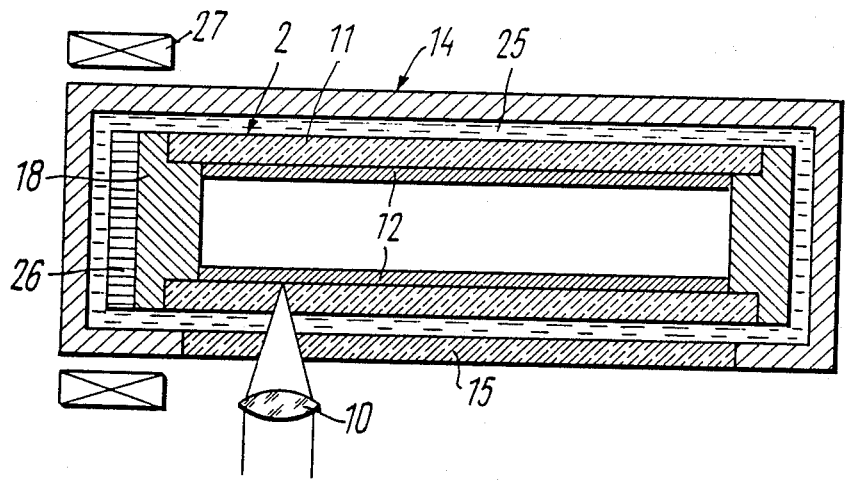
FIG. 4 shows a cylindrical information carrier disposed in a cylindrical container filled with a liquid medium, according to the invention.

In all other respects, the operation and construction of the optical memory of FIG. 4 is analogous to that of FIG. 1.

The liquid medium 25 in the inner space of the cylindrical container 14 dampens the radial and axial wobbling of the cylindrical information carrier 2 and thus permits a much more accurate automatic focusing and keeping to the information track. In this manner, the density and reliability of recording and readout processes is substantially improved.

Figure 5:
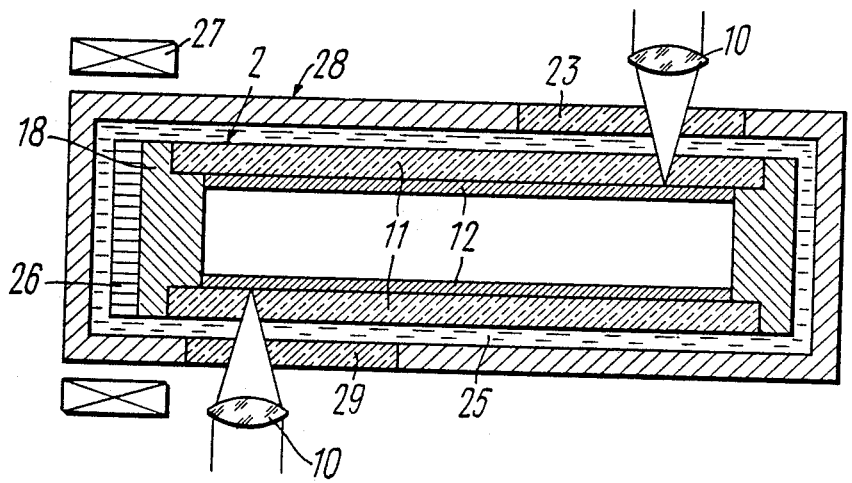
FIG. 5 shows the cylindrical carrier of FIG. 4 featuring two slots in the wall of the cylindrical container and transparent elements disposed therein, according to the invention.

The speed and information readout and recording can be seriously increased if the optical memory makes use of several sources 1 of modulated coherent radiation (FIG. 5). In this case, the lateral wall of a cylindrical container 28 is provided with several slots 29 filled with transparent optical elements, e.g. cylindrical lenses. The number of slots 29 corresponds to the that of sources 1 of modulated coherent radiation in the optical memory.

The internal space of the cylindrical container 28 is filled with a liquid medium 25.

In all other respects the construction and operation of the optical memory of FIG. 5 is analogous to the construction and operation of the device shown in FIG. 4.

To summarize, the optical memory devices described above achieve the object of improving the density and reliability of information recording, readout, and storage.

INDUSTRIAL APPLICABILITY

The present invention can be used advantageously in computers, video and sound recording devices, information storage and processing systems, particularly in external memories of computers.

We claim:

1. An optical memory comprising optically connected units: a source (1) of modulated coherent radiation, a cylindrical information carrier (2) equipped with a rotational drive, a recording coating (12) being applied on a tubular base (11) of said cylindrical information carrier (2), and an addressing unit (3) disposed so that its optical elements are capable of moving axially with respect to the cylindrical information carrier (2); characterized in that said cylindrical information carrier (2) is placed in a stationary cylindrical container (14, 28) including an element transparent for the radiation flux of the source filled with a liquid or gaseous medium transparent for the radiation flux from the source (1) of modulated coherent radiation, said liquid or gaseous medium being used to lubricate said cylindrical information carrier.

2. An optical memory as claimed in claim 1, wherein the cylindrical carrier (2) is provided with a rotational drive, characterized in that said rotational drive is an electric motor having its rotor (16, 26) installed on at least one butt ends of the cylindrical information carrier (2) and its stator (17,27) installed on the external surface of the stationary cylindrical container (14, 28).

3. An optical memory as claimed in claim 1, wherein the cylindrical information carrier (2) is provided with a rotational drive, characterized in that said drive is an electric motor having its rotor (9) installed on the lateral surface of the cylindrical information carrier (2) and its stator (20) installed on the external surface of the stationary cylindrical container (14).

4. An optical memory as claimed in claim 1, characterized in that sealing bushings (18) are installed in the butt ends of the tubular base (11) of the cylindrical information carrier (2).

5. An optical memory as claimed in claim 1, characterized in that the cylindrical container (14, 28) is made from a material non-transparent for the radiation flux and is provided with at least one slot (15,24) in the cylindrical surface thereof, an element transparent for the radiation flux emitted by the source (1) of modulated coherent radiation being disposed on said slot (15, 29).

6. An optical memory as claimed in claim 5, characterized in that the transparent element disposed in said slot is made as a cylindrical lens.

7. An optical memory as claimed in claim 1, characterized in that the recording coating in the cylindrical information carrier (2) is applied both on the external and internal surfaces of the tubular base (11).

8. An optical memory as claimed in claim 1, characterized in that an electrically conducting coating (21) transparent for the radiation flux from the source (1) of modulated coherent radiation is applied on the external surface of the cylindrical information carrier (2) and has electrical contact with the cylindrical container (14).

* * * * *